(12) United States Patent
Filsegger et al.

(10) Patent No.: US 10,562,607 B2
(45) Date of Patent: Feb. 18, 2020

(54) CONTROL SURFACE ELEMENT

(71) Applicant: FACC AG, Ried im Innkreis (AT)

(72) Inventors: Hermann Filsegger, Ried im Innkreis (AT); Walter Stephan, Ried im Innkreis (AT)

(73) Assignee: FACC AG, Ried Im Innkreis (AT)

( * ) Notice: Subject to any disclaimer, the term of this patent is extended or adjusted under 35 U.S.C. 154(b) by 0 days.

(21) Appl. No.: 15/569,046

(22) PCT Filed: Apr. 22, 2016

(86) PCT No.: PCT/AT2016/050107
§ 371 (c)(1),
(2) Date: Oct. 24, 2017

(87) PCT Pub. No.: WO2016/168879
PCT Pub. Date: Oct. 27, 2016

(65) Prior Publication Data
US 2018/0127083 A1    May 10, 2018

(30) Foreign Application Priority Data
Apr. 24, 2015  (AT) .................................. 50332/2015

(51) Int. Cl.
*B64C 9/32*    (2006.01)
*B64C 3/26*    (2006.01)
(Continued)

(52) U.S. Cl.
CPC ............ *B64C 9/323* (2013.01); *B29C 70/443* (2013.01); *B32B 5/18* (2013.01); *B32B 27/065* (2013.01);
(Continued)

(58) Field of Classification Search
CPC .... B64C 1/12; B64C 3/26; B64C 9/00; B64C 9/32; B64C 9/323; B64C 9/326;
(Continued)

(56) References Cited

U.S. PATENT DOCUMENTS 3,229,935 A * 1/1966 Bellanca .................. B64C 3/26
                                              244/123.5
3,519,228 A * 7/1970 Windecker ............... B64C 3/26
                                              244/123.5
(Continued)

FOREIGN PATENT DOCUMENTS

DE           2109934 A1    9/1972
DE      102008013759 A1    9/2009
(Continued)

OTHER PUBLICATIONS

International Bureau of WIPO, International Preliminary Report on Patentability Issued in Application No. PCT/AT2016/050107, dated Nov. 2, 2017, WIPO, 9 pages.
(Continued)

*Primary Examiner* — Joseph W Sanderson
(74) *Attorney, Agent, or Firm* — McCoy Russell LLP

(57) ABSTRACT

A control surface element for an aircraft, more particularly a spoiler, comprising an upper outer skin element that has an outer air flow face; comprising a lower outer skin element; comprising at least one reinforcement rib; and comprising a core element made of a foam material; wherein the reinforcement rib is positioned between two core segments of the core element.

6 Claims, 14 Drawing Sheets

(51) Int. Cl.
    *B32B 5/18* (2006.01)
    *B29C 70/44* (2006.01)
    *B64C 9/00* (2006.01)
    *B32B 27/06* (2006.01)
    *B32B 27/28* (2006.01)
    *B29K 79/00* (2006.01)
    *B29K 105/04* (2006.01)
    *B29L 31/30* (2006.01)

(52) U.S. Cl.
    CPC ............ *B32B 27/281* (2013.01); *B64C 3/26* (2013.01); *B64C 9/00* (2013.01); *B64C 9/32* (2013.01); *B29K 2079/08* (2013.01); *B29K 2105/04* (2013.01); *B29L 2031/3085* (2013.01); *B32B 2605/18* (2013.01); *Y02T 50/43* (2013.01); *Y02T 50/44* (2013.01)

(58) Field of Classification Search
    CPC ............ B29D 99/0025; B29D 99/0028; B29L 2031/3085; B32B 2605/18
    See application file for complete search history.

(56) References Cited

U.S. PATENT DOCUMENTS

| | | | |
|---|---|---|---|
| 3,775,238 A | 11/1973 | Lyman | |
| 4,432,515 A * | 2/1984 | Jarvineva | B64D 37/06 244/123.5 |
| 4,806,077 A | 2/1989 | Bost | |
| 5,224,670 A * | 7/1993 | Padden | B64C 3/20 244/123.3 |
| 5,304,339 A * | 4/1994 | Le Comte | B29C 39/42 264/102 |
| 5,308,228 A * | 5/1994 | Benoit | B29C 70/543 416/230 |
| 5,736,222 A * | 4/1998 | Childress | B29C 70/24 428/119 |
| 6,173,924 B1 * | 1/2001 | Young | B64C 3/48 244/215 |
| 6,187,411 B1 | 2/2001 | Palmer | |
| 6,234,423 B1 | 5/2001 | Hirahara et al. | |
| 6,475,320 B1 * | 11/2002 | Masugi | B29C 70/48 156/189 |
| 6,818,159 B2 * | 11/2004 | Hinz | B29C 70/443 264/102 |
| 6,843,953 B2 * | 1/2005 | Filsinger | B29C 70/086 156/245 |
| 7,226,559 B2 * | 6/2007 | Maxwell | B29C 70/086 264/511 |
| 7,631,840 B2 * | 12/2009 | Kallinen | B64C 9/02 244/123.1 |
| 8,453,972 B2 * | 6/2013 | Billinger | B64C 9/02 244/123.1 |
| 9,180,629 B2 | 11/2015 | Ender | |
| 9,296,463 B2 * | 3/2016 | Zuardy | B64C 3/20 |
| 9,339,976 B2 * | 5/2016 | Schneiderbauer | B29C 70/443 |
| 9,371,128 B2 * | 6/2016 | Zuardy | B64C 3/20 |
| 9,415,855 B2 * | 8/2016 | Normand | B64C 3/26 |
| 9,475,258 B2 * | 10/2016 | Henry | B29B 15/10 |
| 2002/0020934 A1 * | 2/2002 | Hinz | B29C 70/443 264/40.6 |
| 2002/0100840 A1 * | 8/2002 | Billinger | B64C 9/02 244/131 |
| 2003/0011094 A1 * | 1/2003 | Filsinger | B29C 70/086 264/102 |
| 2006/0049552 A1 | 3/2006 | Fish | |
| 2009/0072090 A1 | 3/2009 | Kallinen et al. | |
| 2010/0151189 A1 | 6/2010 | Chakrabarti | |
| 2013/0011605 A1 * | 1/2013 | Miller | B29D 99/0014 428/119 |
| 2013/0266765 A1 * | 10/2013 | Dolzinski | B29C 70/086 428/158 |
| 2013/0273301 A1 * | 10/2013 | Zuardy | B64C 3/20 428/98 |
| 2014/0000381 A1 * | 1/2014 | Zuardy | B64C 3/20 73/802 |
| 2014/0001682 A1 * | 1/2014 | Schneiderbauer | B29C 70/443 264/571 |
| 2014/0050884 A1 * | 2/2014 | Zuardy | B64C 3/20 428/137 |
| 2014/0205793 A1 * | 7/2014 | Henry | B29B 15/10 428/111 |

FOREIGN PATENT DOCUMENTS

| | | |
|---|---|---|
| DE | 102010027696 A1 | 1/2012 |
| EP | 0532016 A1 | 3/1993 |
| EP | 1227035 A2 | 7/2002 |
| GB | 2262315 A | 6/1993 |
| RU | 78134 U1 | 11/2008 |
| WO | 0168353 A1 | 9/2001 |
| WO | 2012119163 A1 | 9/2012 |

OTHER PUBLICATIONS

ISA European Patent Office, International Search Report Issued in Application No. PCT/AT2016/050107, dated Jul. 29, 2016, WIPO, 6 pages.

* cited by examiner

Detail A

CONTROL SURFACE ELEMENT

CROSS-REFERENCE TO RELATED APPLICATIONS

The present application is a U.S. National Phase of International Patent Application Serial No. PCT/AT2016/050107, entitled "CONTROL SURFACE ELEMENT" filed on Apr. 22, 2016. International Patent Application Serial No. PCT/AT2016/050107 claims priority to Austrian Patent Application No. A 50332/2015, filed on Apr. 24, 2015. The entire contents of each of the above-cited applications are hereby incorporated by reference in their entirety for all purposes.

TECHNICAL FIELD

The invention relates to a control surface element for an aircraft, in particular a spoiler, comprising an upper outer skin element which has an outer face which may be flown around by air, comprising a lower outer skin element, comprising at least one reinforcement rib and comprising a core element made of a foam material.

BACKGROUND AND SUMMARY

The invention further relates to a method for producing a control surface element, in particular a spoiler, wherein an upper outer skin element is connected to a lower outer skin element, wherein at least one reinforcement rib is formed, wherein a core element made of a foam material is provided.

In the prior art various designs of air-flow aerodynamic control surface elements (designated in English as "control surfaces") have been proposed by means of which flight control is accomplished. In the case of spoilers, usually a honeycomb core structure is provided which consists of supporting covering skins and a support core in honeycomb shape. However, this design has various disadvantages. It has been shown that the known control surfaces having a honeycomb structure are on the one hand liable to water ingress. On the other hand, a uniform impact protection cannot always be ensured. In the event of a collision between the walls of the honeycomb core, damage can occur. Furthermore, the air travel industry is continuously striving to achieve weight savings.

U.S. Pat. No. 6,234,423 B1 describes an elevator in which an upper outer skin and a lower outer skin are fabricated in two separate process steps. Each outer skin is formed by prepregs provided with core materials (i.e. fibre semi-finished products pre-impregnated with reaction resins) which is cured in an autoclave under pressure and heat. The upper outer skin is then adhesively bonded to the lower outer skin. During the manufacture of the outer skins, stiffening ribs are formed which have a self-closed cross-section which is filled with a form core. However, cavities are formed between the stiffening ribs. The known method is disadvantageously restricted to the fabrication of elevators, wherein the process sequence is additionally very complicated. The fabrication of the outer skins by prepregs in separate process steps is complex and expensive. Furthermore, the adhesive connections between the upper and lower outer skin are weak points which are susceptible to damage, in particular by impact loads. Accordingly, no effective force transfer from the upper side to the lower side of the control surface can be ensured. A further disadvantage consists in that the known elevator provides cavities between the reinforcement ribs which are susceptible to water ingress. As a result of these limitations, the known method does not meet the valid licensing requirements for air traffic.

US 2009/072090 A1 relates to a control surface element for an aircraft wing. In one embodiment, a reinforcement structure is disposed between outer skin elements. The reinforcement structure is located between two honeycomb cores. In addition, a free space is formed between two legs of the reinforcement structure U.S. Pat. No. 3,775,238 A discloses an aileron with outer skin panels between which reinforcement ribs are disposed. The outer skin panels are constructed as composite components with a form core. In this prior art, free spaces also remain between the reinforcement ribs of the aileron.

DE 10 2008 013 759 A1 describes the manufacture of a fibre composite component in the form of an aerodynamic control surface which comprises stiffening elements enclosed by an outer skin. Here removable cores are introduced in a core mould in order to image the inner surface geometry of the fibre composite component. A fibre semi-finished product is then placed on the cores. The fibre composite component is finally fabricated in the RTM method. The cores are then removed. Accordingly in this prior art the cores are finally removed. For this purpose the core material of the cores is a fusible material whose melting point lies above the curing temperature of the matrix material or a curable substance which can be dissolved again subsequently by a suitable solvent and can be rinsed out from the subsequent component. Bores introduced subsequently in the outer skin or openings arranged in corner regions of the transverse ribs are used to remove the cores, and subsequently serve as drainage openings for the condensation water.

The document EP 1 227 035 A2 discloses a spoiler in which a fitting made of plastic material is provided. The spoiler has a lightweight core in the form of a honeycomb core which is covered with an upper cover layer and a lower cover layer. The lightweight core has a cut-out corresponding to the fitting.

In view of this, it is the object of the invention to eliminate or ameliorate individual ones or all the disadvantages of the prior art. The invention therefore in particular has the aim of creating a control surface element of the type specified initially which can be produced by a simplified method, in particular by an infusion method and facilitates the formation of the at least one reinforcement rib.

According to the invention, the reinforcement rib is disposed between two core segments of the core element.

Advantageously the reinforcement rib (or a semi-finished product to form the reinforcement rib) can be reliably fixed laterally by the core segments, i.e. in the longitudinal direction of the control surface element (or in the span width direction of the aircraft). Preferably a plurality of reinforcement or stiffening ribs spaced apart in the longitudinal direction of the control surface element are provided. The design according to the invention enables the fabrication of the control surface element in an infusion process in which a plastic in the liquid state is guided, in particular sucked, through a fibre semi-finished product in order to jointly produce the upper outer skin, the lower outer skin and the reinforcement rib. During fabrication the reinforcement rib can be precisely positioned and moulded by the core segments in contact therewith. Furthermore, the arrangement of the core element has the advantage that the control surface element is better protected from water ingress during operation. Furthermore, it is advantageous that the impact protection is improved. If the core element, apart from the at least one reinforcement rib between the core segments, extends over substantially the entire length (or extension in the longitudinal direction of the control surface element) of the intermediate space between the upper and the lower outer skin of the control surface element, water ingress along the control surface element can be reliably prevented. Furthermore, it is preferably provided that the core segments of the one- or multipart core element extend substantially over the entire width (i.e. its extension in the principal plane of the control surface element, substantially perpendicular to its longitudinal direction) of the intermediate space between the upper and lower outer skin. This has on the one hand the advantage that the reinforcement rib is fixed over its length. On the other hand, the protection against water ingress can be further improved. For the purpose of this disclosure the directional information "above", "below", "front", "rear" relate to the installed state of the control surface element by reference to the preferred application in a spoiler. For other types of control surface elements, the directional information should be applied as appropriate.

In order to stabilize or fix the reinforcement rib (or a semi-finished product to form the reinforcement rib) during fabrication in the longitudinal direction of the control surface element, it is advantageous if the reinforcement rib comprises at least one web extending substantially perpendicular to the longitudinal direction of the upper outer skin element, wherein the one core segment is in contact with the one longitudinal side of the web of the reinforcement rib and the other core segment is in contact with the other longitudinal side of the web of the reinforcement rib. Preferably the web of the reinforcement rib is disposed substantially perpendicular to the upper outer skin element. In this way, the reinforcement rib is held reliably between the two core segments during fabrication, for example, in an infusion process.

The reinforcement rib can have different cross-sectional geometries. It is preferred however that the reinforcement rib has an open cross-section. In contrast to a closed cross-section, this means that the reinforcement rib does not have an interior closed on all sides. The reinforcement rib is therefore held in the longitudinal direction of the control surface element (i.e. in the span width direction of the aircraft wing) by the core segments which are in contact with the reinforcement rib.

In order to bring about force transmission between the upper side of the control surface element and the lower side of the control surface element, the web of the reinforcement rib preferably extends from the inner side of the upper outer skin element to the inner side of the lower outer skin element.

Preferably the core element substantially completely fills intermediate spaces formed between the upper outer skin element, the lower outer skin element and the at least one reinforcement rib. In this embodiment the control surface element is substantially free from inner cavities whereby any ingress of water can be reliably prevented. Incidentally the protection against impact loads in the installed state is also substantially improved. Compared to this, control surface elements in the form of spoilers having a honeycomb core on the one hand had the disadvantage that water can penetrate into the empty intermediate spaces. On the other hand, impact loads between the walls of the honeycomb structure could cause damage. Furthermore, the present embodiment has the advantage that the reinforcement rib (or the semi-finished product provided for this) is fixed on all sides during the manufacturing process.

According to a particularly preferred embodiment, a fibre composite element, in particular made of carbon-fibre-reinforced plastic is provided as reinforcement rib, which fibre composite element is disposed between two separate core segments of the core element. The fibre composite element is formed by a fibre semi-finished product, in particular a fibre scrim, a fibre woven fabric, a fibre mesh, a fibre knitted fabric, a fibre mat which is impregnated or infiltrated with a cured plastic, for example, epoxy resin.

In this embodiment it is favourable if the reinforcement rib comprises at least one upper flange extending substantially parallel to the principal plane of the upper outer skin element and arranged on the inner side of the upper outer skin element and/or a lower flange extending substantially parallel to the principal plane of the lower outer skin element and arranged on the inner side of the lower outer skin element, wherein the upper and/or the lower flange is disposed at an angle, preferably substantially at right angles to the web of the reinforcement rib. Preferably the reinforcement rib has a C-profile which is formed by the web with the flanges angled therefrom. This design enables a favourable removal (transfer) of load from the upper outer skin element with the upper-side outer surface and from the lower outer skin element with the lower-side outer surface into the reinforcement rib of the control surface element.

In order to arrange the upper or lower flange of the reinforcement rib substantially flush with adjoining sections of the upper or lower side of the core element, it is preferably provided that at least one of the core segments has a lower recess for the lower flange of the reinforcement rib on a lower side facing the inner side of the lower outer skin element and/or an upper recess for the upper flange of the reinforcement rib on an upper side facing the inner side of the upper outer skin element. In this way, the core element can substantially completely fill the intermediate space between the upper and lower outer skin element.

According to an alternative preferred embodiment, the core element is provided with seams made of fibre composite material to form the at least one reinforcement rib. Accordingly, in this embodiment the reinforcement rib is formed by a replacement structure of reinforcement seams. In this embodiment the reinforcement rib is also disposed between two core segments which are formed on both sides of the seam made of fibre composite material. As a result of the precisely fitting arrangement of the seams made of fibre composite material in through holes of the core element, the fibre semi-finished product is fixed for the formation of the reinforcement rib during fabrication. The reinforcement of foam with seams made of fibre composite material is known per se in the prior art. For example, a conventional method by means of which reinforced foam materials can be fabricated is known in the aircraft industry. As in this prior art, during the manufacture of the present control surface element a through-hole can be initially created in the foam material of the core element. Then a fibre bundle is disposed on the one side of the core element, then a hook-shaped needle is guided from the other side of the core element through the through hole and finally the fibre bundle is drawn through the through hole in the foam material. During manufacture the fibre bundle is impregnated with plastic in the liquid state in order to obtain the seams made of fibre composite material. In this embodiment the reinforcement rib is therefore integrated into the core element which is preferably formed in one piece. The fibre bundle preferably consists of a plurality of individual fibres or monofilaments.

In order to form the reinforcement rib in the core element, it is favourable if the seams of fibre composite material each extend from the upper side of the core element facing the upper outer skin element to the lower side of the core element facing the lower outer skin element. This embodiment additionally enables the arrangement of the seams in through-holes of the core element which extend from its upper side to the lower side.

In order to form the reinforcement rib in the transverse direction of the control surface element, it is favourable if a plurality of seams made of fibre composite material are disposed on a plane of the core element, the plane running substantially perpendicular to the upper or lower side. In this embodiment, the reinforcement rib is obtained by providing the core element along a vertical plane with a plurality of individual seams which in their entirety form the reinforcement rib in the transverse direction of the control surface element. Preferably individual seams are provided substantially over the entire width of the core element, i.e. over its entire extension perpendicular to the longitudinal direction of the control surface element. In order to form a reinforcement rib having a certain width (or extension in the longitudinal direction of the control surface element), it is favourable if a plurality of planes of the core element extending substantially perpendicular to the upper or lower side and arranged at a distance from one another are penetrated by seams made of fibre composite material. The width of the reinforcement rib is determined by the distance between the outer vertical planes with the seams when viewed in the longitudinal direction of the control surface element. The length of the reinforcement rib preferably substantially corresponds to the width of the core element which in the case of a spoiler is the extension in the depth or flight direction.

In this embodiment, it is furthermore favourable if a flat fibre composite element is disposed between the upper side of the core element and the inner side of the upper outer skin element in the region of the seams made of fibre composite material forming the reinforcement rib, which fibre composite element is preferably disposed substantially perpendicular to the reinforcement rib. Accordingly, another flat fibre composite element can be disposed between the lower side of the core element and the inner side of the lower outer skin element in the region of the seams made of fibre composite material forming the reinforcement rib, which other or further fibre composite element is preferably also disposed substantially perpendicular to the reinforcement rib. The flat fibre composite elements can be sewn to the core element. In this embodiment, a reinforcement structure having an I-shaped or C-shaped cross-section can be created, wherein the reinforcement rib forms the web, the flat fibre composite element forms the upper flange and the further fibre composite element forms a lower flange of the C- or I-shaped reinforcement structure.

For stability reasons it is favourable if the seams made of fibre composite material are arranged at an angle differing from 90° of preferably between 30 and 60°, in particular of substantially 45°, with respect to the upper or lower side of the core element.

In known control surface elements, in particular spoilers, a reinforcement or end strip of fibre composite material was disposed in many cases at the rear edge when viewed in the direction of flight (also designated as "trailing edge" in aircraft construction).

In the previously described embodiment, instead of the reinforcement strip, on a rear edge the core element can be provided with a reinforcing structure running substantially in the longitudinal direction of the upper outer skin element, which reinforcing structure is formed by further seams of fibre composite material. In this embodiment the core element is penetrated in the region of the rear edge or "trailing edge" by seams which together form the reinforcement structure in the longitudinal direction (i.e. in the case of a spoiler in the span width direction) of the control surface element. Preferably the reinforcement structure extends substantially over the entire length of the core element, i.e. substantially over its entire extension in the longitudinal direction of the control surface element. The further seams for the reinforcement structure at the rear edge of the core element can be configured like the seams for the reinforcement rib so that reference is made to the preceding explanations. Furthermore, here also seams can be provided at an angle of substantially 90° to the upper or lower side of the core element.

According to an alternative preferred embodiment, in order to form the reinforcement rib a form element separate from the core element is provided, which is provided with seams made of fibre composite material. In this embodiment, a form element of higher density or strength is preferably disposed between two core segments of the core element having lower density or strength compared to this. In order to obtain the reinforcement rib, seams of fibre composite material pass through corresponding through-holes of the form element.

The previously described embodiment in particular has the advantage that the form element of the reinforcement rib can consist of a form which is different from the form material of the core element or of the same form material with a higher density compared to this. Advantageously the form of the form element can be optimized in this way with regard to the introduction of seams made of fibre composite material or lower resin acceptance. Compared with this, the form material of the core element can be adapted to its intended usage. In order to achieve an integral control surface element, it is favourable if the upper outer skin element, the lower outer skin element and the at least one reinforcement rib consist of fibre composite material, in particular carbon-fibre-reinforced plastic, wherein the upper outer skin element, the at least one reinforcement rib and the lower outer skin element are interconnected via the plastic of the fibre composite material. Advantageously an integral connection is made between the upper outer skin element, the lower outer skin element and the interposed reinforcement rib which is substantially exclusively formed by the plastic of the fibre composite material. This means that the plastic in the liquid state impregnates a fibre semi-finished product by means of which the upper or lower outer skin element and the reinforcement rib is formed. As a result of the impregnation of the fibre semi-finished product with the plastic in the liquid state, a seamless bond between the upper or lower outer skin element and the at least one reinforcement rib is achieved. This embodiment brings about a substantial simplification compared with the prior art in which the upper and the lower outer skin element together with reinforcement ribs are fabricated separately and then adhesively bonded to one another (or bolted or riveted). Advantageously in the present embodiment such an adhesive, bolted or riveted connection between the upper and the lower outer skin element and the reinforcement rib can be dispensed with, whereby a structural weak point of the control surface element is eliminated. Furthermore, the drill holes possibly present in the prior art which form potential leaks for an ingress of liquid can be eliminated. In addition, the process sequence can be configured substantially more simply and rapidly.

In order to keep the weight of the control surface element as low as possible but ensure sufficient stability for the reinforcement rib, it is advantageous if the form material of the core element is formed from polymethacrylimide. Such a form is marketed for example under the trade name "Rohacell". This form has a weight of 31 kilograms per cubic meter. However other hard forms can also be used for the core element which consist for example of polyvinyl-chloride or polyurethane.

In the method according to the invention, the reinforcement rib is positioned or formed between two core segments of the core element. This method has the advantages described previously for the control surface element to which reference can thus be made. It is essential for the invention that the reinforcement rib is fixed laterally during the manufacturing method between the core segments of the core element, thereby ensuring the exact positioning and formation of the reinforcement rib.

In order to produce the control surface element, preferably a fibre semi-finished product is disposed in the dry state on the core element in order to form the upper outer skin element, the lower outer skin element and the at least one reinforcement rib and is then impregnated with a plastic in the liquid state. In this embodiment, the upper outer skin element, the lower outer skin element and the at least one reinforcement rib are therefore produced in the same process step ("in one shot"). This means that the upper and lower outer skin element together with the reinforcement rib are joined together in the non-cured state of the plastic. It is therefore not necessary, as is usual in many cases in the prior art, to produce the upper outer skin element and the lower outer skin element in separate process steps by curing prepregs in an autoclave and then adhesively bonding, bolting or riveting them together in the cured state. It is not necessary to use an autoclave in the present embodiment. The curing of the impregnated fibre semi-finished product can take place in an oven with temperature supply or in vacuum.

In order to form the upper outer skin element, the lower outer skin element and the at least one reinforcement rib in one process step, it is advantageous if the fibre semi-finished product is arranged by means of a film in an infusion space which is connected to at least one supply line for the plastic in the liquid state and to at least one vacuum line, wherein by applying a negative pressure to the vacuum line the plastic in the liquid state is sucked in, wherein the fibre semi-finished product is impregnated to form the upper outer skin element, the lower outer skin element and the at least one reinforcement rib. Preferably the control surface element is therefore produced in an infusion process wherein the core element ensures that the fibre semi-finished product is held in the desired position for the at least one reinforcement rib when the plastic in the liquid state is guided through the fibre semi-finished product. Such infusion processes are known per se in the prior art.

Preferably a process known as MARI ("Membrane Assisted Resin Infusion") is used which is described in the European Patent EP 2 681 037. When using this process, the fibre semi-finished product is disposed on a carrier mould wherein an infusion space sealed with respect to the carrier mould is formed with an airtight film. The infusion space is connected on the one hand to at least one supply line for the plastic in the liquid state and on the other hand to at least one vacuum line. A negative pressure is applied to the vacuum line in order to impregnate the fibre semi-finished product with plastic. The vacuum line has a membrane filter which is permeable to air and impermeable to resin in the dry state, which goes over into a substantially airtight state during an impregnation with resin. After complete impregnation of the fibre semi-finished product, the plastic enters into the vacuum line which has the membrane filter. When completely wetted with resin, the membrane filter closes whereby the air extraction is interrupted. In a preferred embodiment of the membrane filter which is known from sports clothing, a thin silicone skin is provided which is overstretched in the production process in such a manner that fine pores are produced which are permeable to air by impermeable to liquid, in the present case resin. In contact with resin, the pores gradually become closed so that the membrane goes over into the airtight state. The silicone skin can be connected to a carrier layer in the form of a woven fabric.

Furthermore it is also feasible to produce the control surface element using the injection process described in EP 1 181 149 B1.

BRIEF DESCRIPTION OF THE FIGURES

The invention will be explained further hereinafter with reference by preferred exemplary embodiments to which is should not be restricted however. In the drawings.

DETAILED DESCRIPTION

Figure 1:
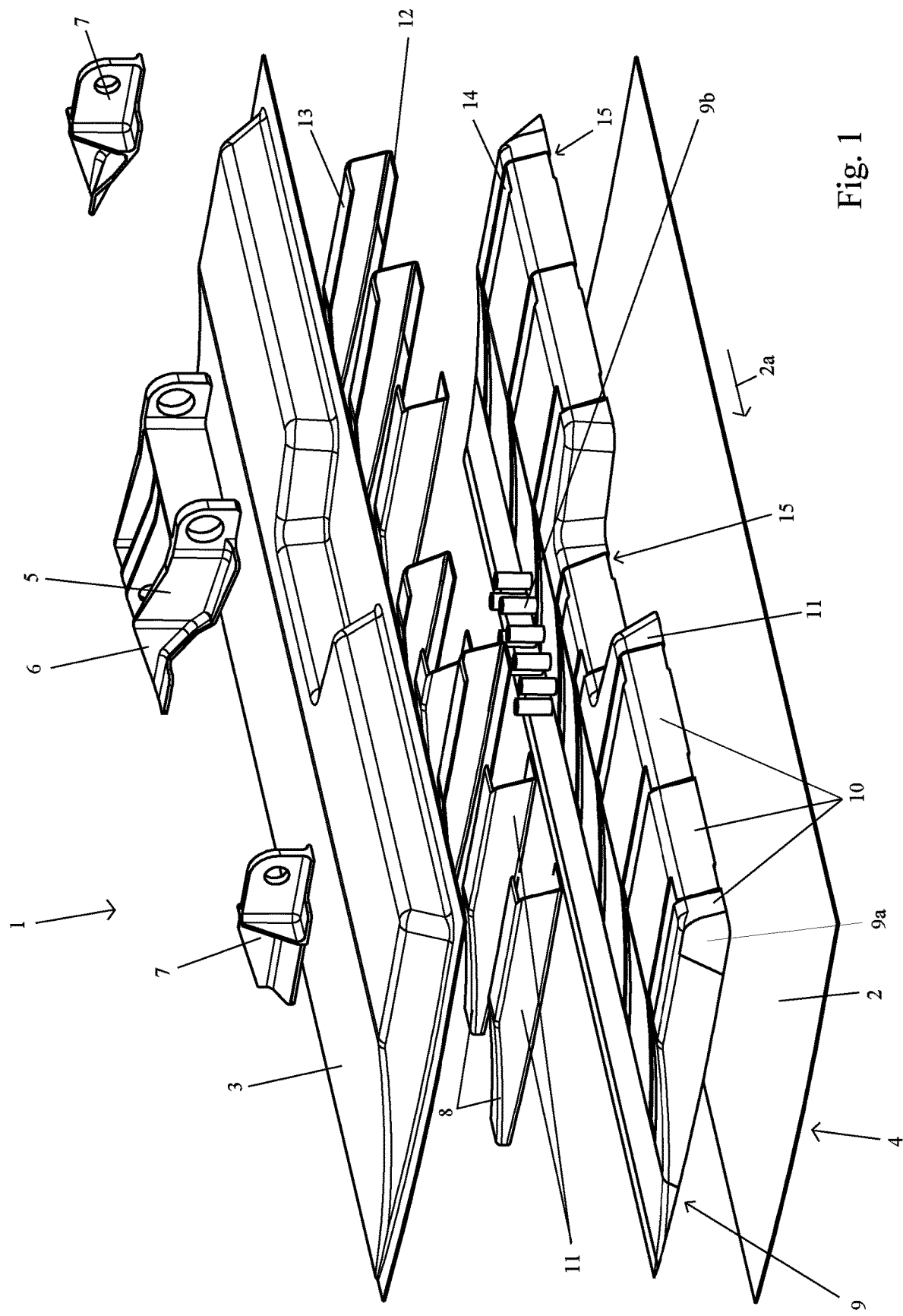
FIG. 1 shows an exploded view of a control surface element according to the invention comprising an upper and a lower outer skin element, wherein a plurality of reinforcement ribs, in the embodiment shown eight, are disposed between core segments of a hard form core element.
Figure 2:
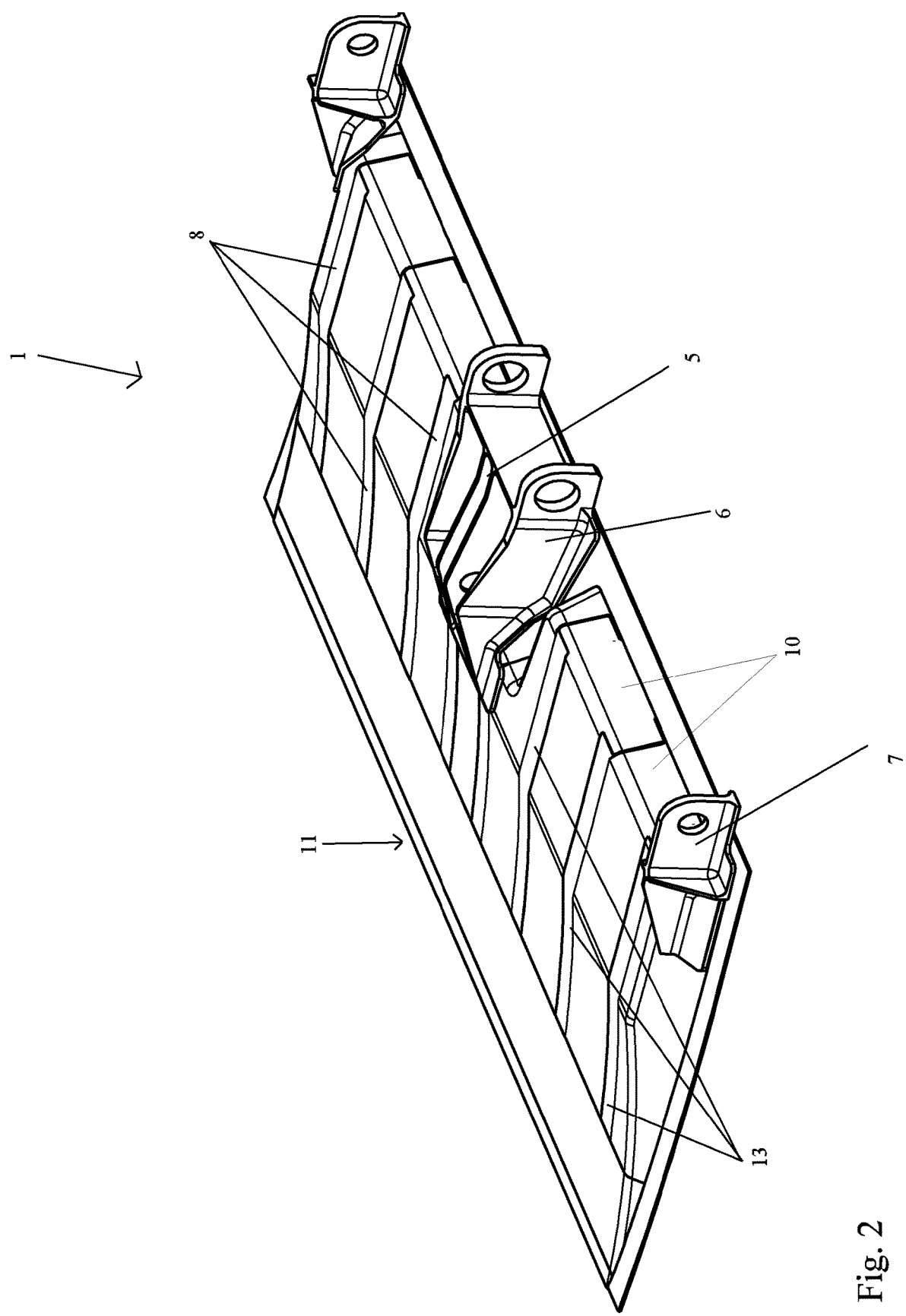
FIG. 2 shows a view of another control surface element according to the invention with a view of its lower side wherein the lower outer skin element is omitted.

FIGS. 1, 2 show a control surface element 1 for an aircraft (not shown). In the embodiment shown the control surface element 1 is configured as a spoiler for an aircraft. Corresponding embodiments can however also be provided for other air flow control surfaces of aircraft, in particular for rudders and (landing) flaps. The control surface element 1 comprises (in relation to the installed state in an aircraft wing) an upper shell element or outer skin element 2 and a lower shell element or outer skin element 3. The upper outer skin element 2 has on its upper side an aerodynamic substantially flat outer face 4 which may be flown around by air. The lower outer skin element 3 in the inactive state of the spoiler is disposed inside the aircraft wing. The control surface element 1 has a bearing device 5 for articulated mounting of the fibre composite element 3 on a structure component, namely on an aircraft wing box. The bearing device 5 comprises a bearing element 6 provided in the embodiment shown centrally on a front longitudinal edge of the control surface element 1 (viewed in the direction of flight) by means of which bearing element 6 a pivotable mounting of the control surface element 1 on the aircraft wing can be achieved. The bearing element 6 can also be arranged off-centre. The terms "front", "rear", "top", "bottom" relate to the installed state of the control surface element 1 as intended for the purpose of this disclosure. The control surface element 1 is substantially rectangular in plan view so that a longitudinal extension (with the spoiler in the span width direction) and a transverse extension (with the spoiler substantially perpendicular to the span width direction) is formed. The bearing device 5 has further bearing elements 7 laterally on the leading edge. Since the configuration of the bearing device 5 is sufficiently known in the prior art, more detailed explanations can be dispensed with (cf. on this matter for example also AT 409 482 B).

As can be further seen from FIGS. 1, 2, a plurality of elongate reinforcement ribs 8 are disposed between the upper outer skin element 2 and the lower outer skin element 3, which are extended at a distance from one another in the transverse direction of the control surface element 1. The reinforcement ribs 8 bring about a reinforcement or stiffening of the control surface element 1. In the embodiment of FIG. 1, individual fibre composite elements, in particular made of carbon fibre reinforced plastic are provided as reinforcement ribs 8.

Furthermore, a core element 9 can be seen in FIGS. 1, 2 which consists of individual core segments 10. The core element 9 consists of a foam material, preferably of polymethacrylimide. In the embodiment shown each reinforcement rib 8 is disposed in a substantially precisely fitting manner between two core segments 10 of the core element 9. The individual core segments 10 of the core element 9 substantially completely fill the intermediate spaces between the upper outer skin element 2, the lower outer skin element 3 and the individual reinforcement ribs 9 (or a reinforcement strip or end strip at the trailing edge). FIGS. 1, 2 further show a wedge element 9a, in particular made of glass fibre reinforced plastic at a corner region of the core element 9 and tube elements 9b perpendicular to the core element 9, in particular made of carbon fibre reinforced plastic, in the region of the bearing device 5. Depending on the design, the tube elements 9b can also be omitted.

According to FIG. 1, each reinforcement rib 8 comprises precisely one web 11 extending substantially perpendicular to the longitudinal direction 2a of the upper outer skin element 2, which web 11 is disposed substantially perpendicular to the principal plane of the upper 2 and/or lower outer skin element 3. In the installed state the webs 11 of the reinforcement ribs 8 are in contact with one core segment 10 each, on both longitudinal sides, whereby the reinforcement ribs 8 are fixed in their position. The web 11 of the reinforcement rib 8 runs from the inner side of the upper outer skin element 2 to the inner side of the lower outer skin element 3. Accordingly, the height of the web 11 (i.e. its extension perpendicular to the principal plane of the upper outer skin element 2) substantially corresponds to the distance between the inner side of the upper outer skin element 2 and the inner side of the lower outer skin element 3. Furthermore, the reinforcement rib 8 shown in FIG. 1 has an upper flange 12 extending substantially parallel to the principal plane of the upper outer skin element 2 and arranged on the inner side of the upper outer skin element 2 and a lower flange 13 extending substantially parallel to the principal plane of the lower outer skin element 3 and arranged on the inner side of the lower outer skin element 3. In the embodiment shown the upper flange 12 and the lower flange 13 are each arranged at right angles to the web 11 of the reinforcement rib 8. Depending on the embodiment however, different angular positions of the upper 12 or lower flange 13 can also be provided.

As is further apparent from FIG. 1, the core segments 10 have lower recesses 14 on a lower side facing the inner side of the lower outer skin element 3 for the lower flanges 13 of the reinforcement ribs 8 and upper recesses 15 on an upper side facing the inner side of the upper outer skin element 2 for the upper flanges of the reinforcement ribs 8. Furthermore the reinforcement ribs 8 can have wing elements arranged substantially perpendicular to the principal plane of the upper outer skin element 2 and extending in the longitudinal direction 2a, which wing elements are disposed at corresponding front-side recesses of the core element (not shown).

FIGS. 3 to 6 show an alternative embodiment of the control surface element 1 in which the core element 9 is penetrated by seams 18 made of fibre composite material to form the reinforcement ribs 8. The seams 18 of fibre composite material each extend from the upper side of the core element 9 facing the upper outer skin element 2 to the lower side of the core element 9 facing the lower outer skin element 3. In order to form the reinforcement rib 8 in the transverse direction of the control surface element 1, a plurality of seams 18 made of fibre composite material are disposed on a plane of the core element running substantially perpendicular to the upper or lower side. In the embodiment shown a plurality of planes of the core element 9 arranged at a distance from one another and extending substantially perpendicular to the upper or lower side are penetrated by seams 18 made of fibre composite material. The seams 18 made of fibre composite material are arranged in the embodiment shown at an angle of substantially 45° with respect to the upper or lower side of the core element. Furthermore, flat or plane fibre composite elements can be provided on the upper or lower side of the core element which fibre composite elements are directly connected to the reinforcement rib 8 made of the seams 18. Thus, an upper or lower flange reinforcement is formed on the inner side of the upper outer skin element 2 or on the inner side of the lower outer skin element 3. In order to form the flat fibre composite elements, during manufacture a fibre semi-finished product, for example a fibre woven fabric, can be arranged on the upper side or lower side of the core element, above or below the fibre semi-finished product for the reinforcement rib 8, wherein the fibre semi-finished product is impregnated with plastic in the infusion process. Depending on the embodiment a reinforcing structure having a C- or I-shaped cross-section is created in this way.

Figure 3:
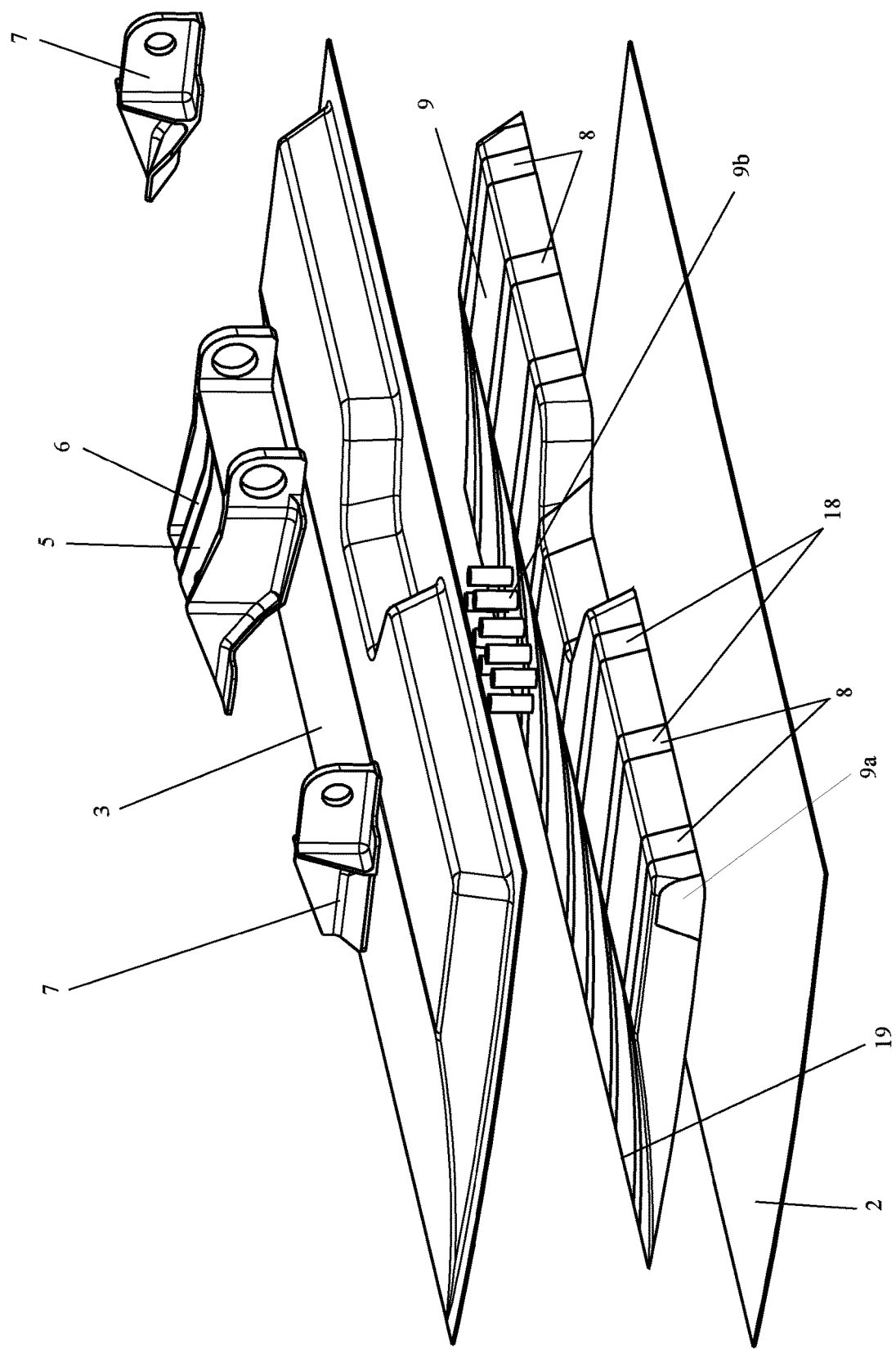
FIG. 3 shows a view of another control surface element according to the invention with a view of its lower side wherein the lower outer skin element is again omitted.
Figure 4:
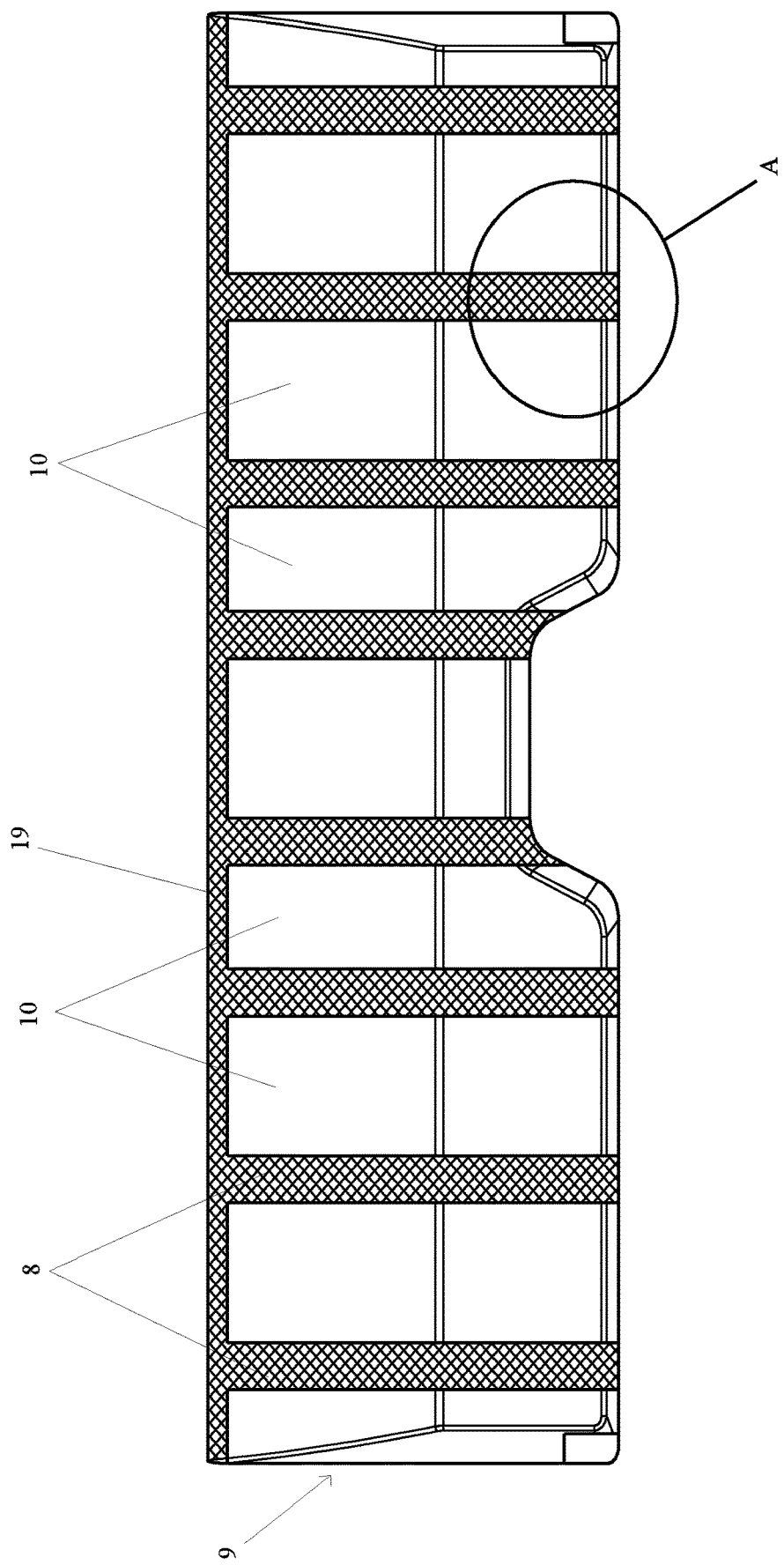
FIG. 4 shows a plan view of the core element for the control surface according to FIG. 3.
Figure 5:
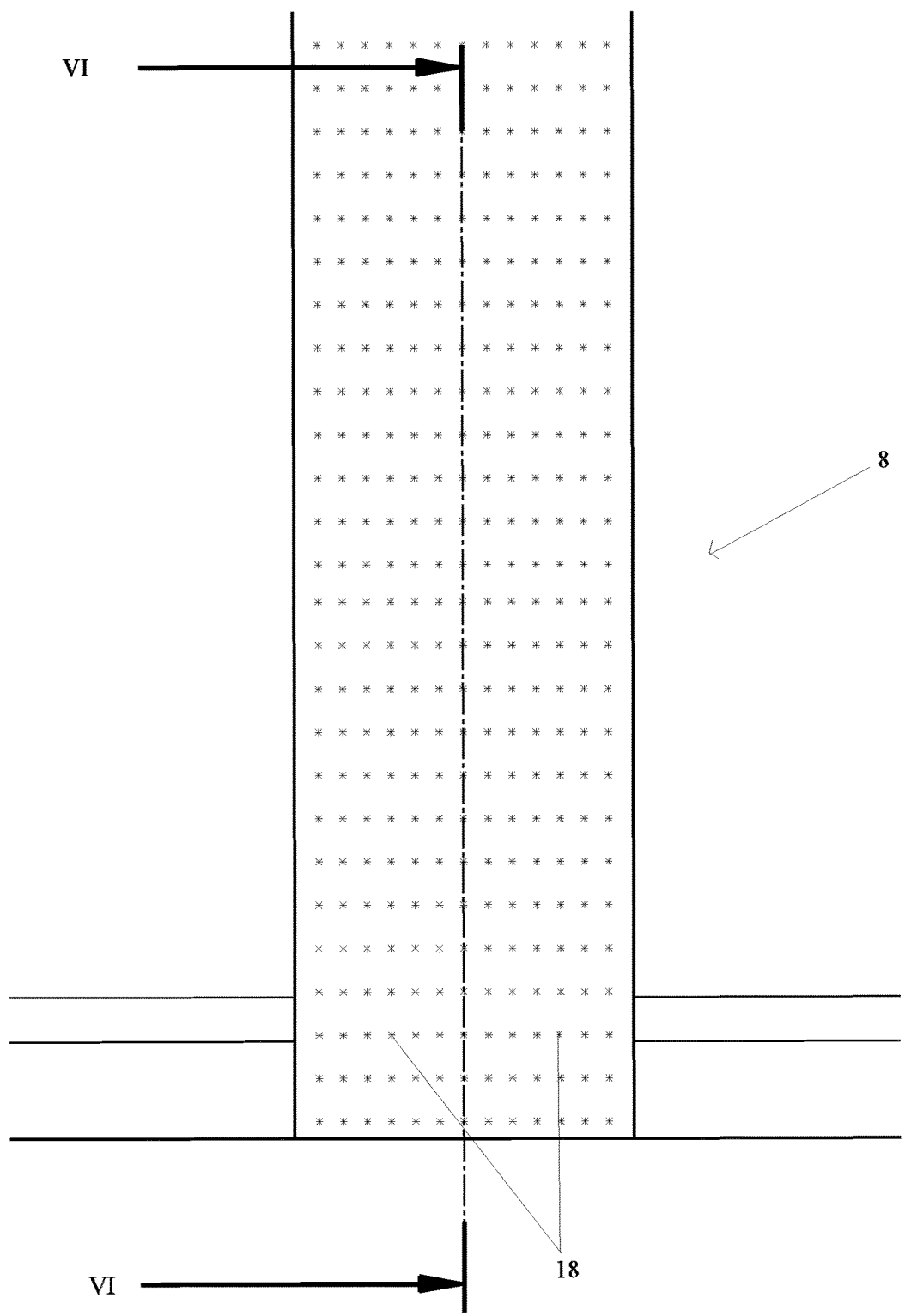
FIG. 5 shows a view of the detail A indicated by a circle in FIG. 4.
Figure 6:
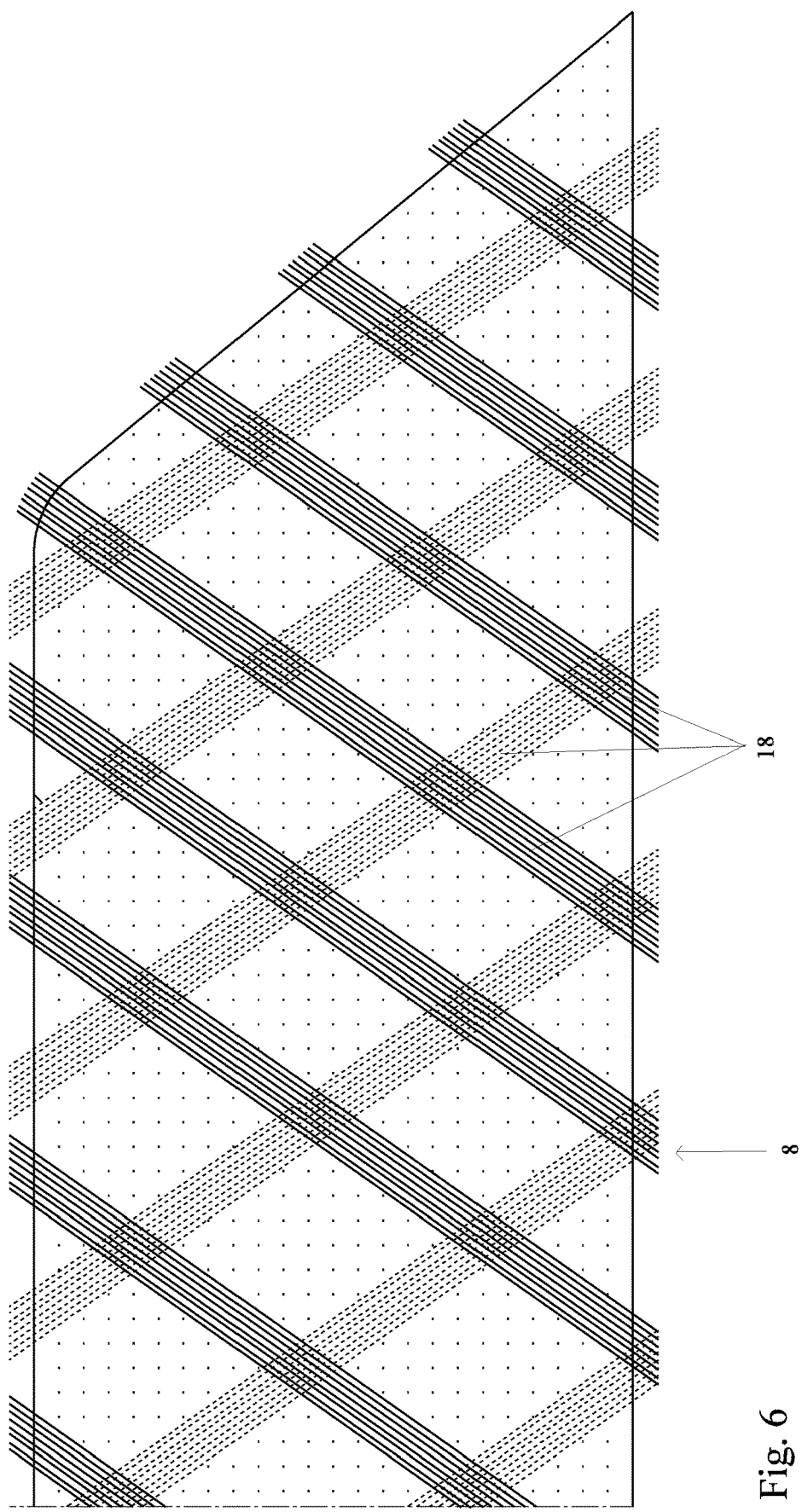
FIG. 6 shows a section along the line VI-VI in FIG. 5.

As can be further seen from FIGS. 3, 4, the core element 9 is provided at a trailing edge with a reinforcing structure 19 running substantially in the longitudinal direction 2a of the upper outer skin element 2, which reinforcing structure 19 is formed by further seams made of fibre composite material.

Figure 7:
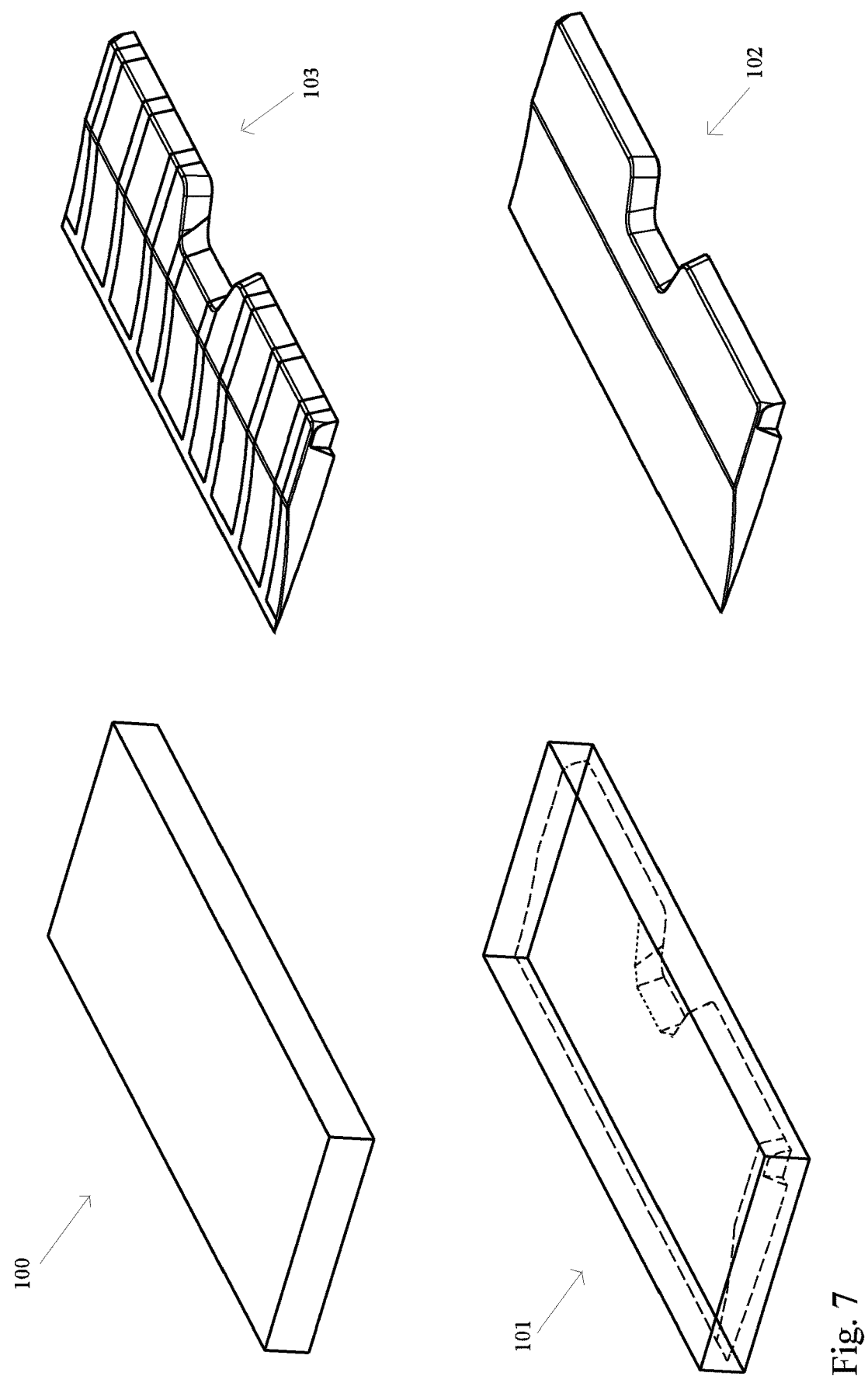
FIG. 7 shows schematically the fabrication of the core element according to FIGS. 4 to 6.

FIG. 7 shows schematically the manufacture of the core element 8 reinforced with seams of fibre bundles. According to arrow 100, a rectangular block of foam material is prepared. The core element 9 is produced, for example, milled from the rectangular block, cf. arrow 101, in order to obtain a (still unreinforced) core element 9 of foam material (arrow 102). Finally the seams 18 are provided using the method of EP 1 993 526 B1 so that the reinforcement ribs 8 are formed in the transverse direction of the core element 9.

Figure 8:
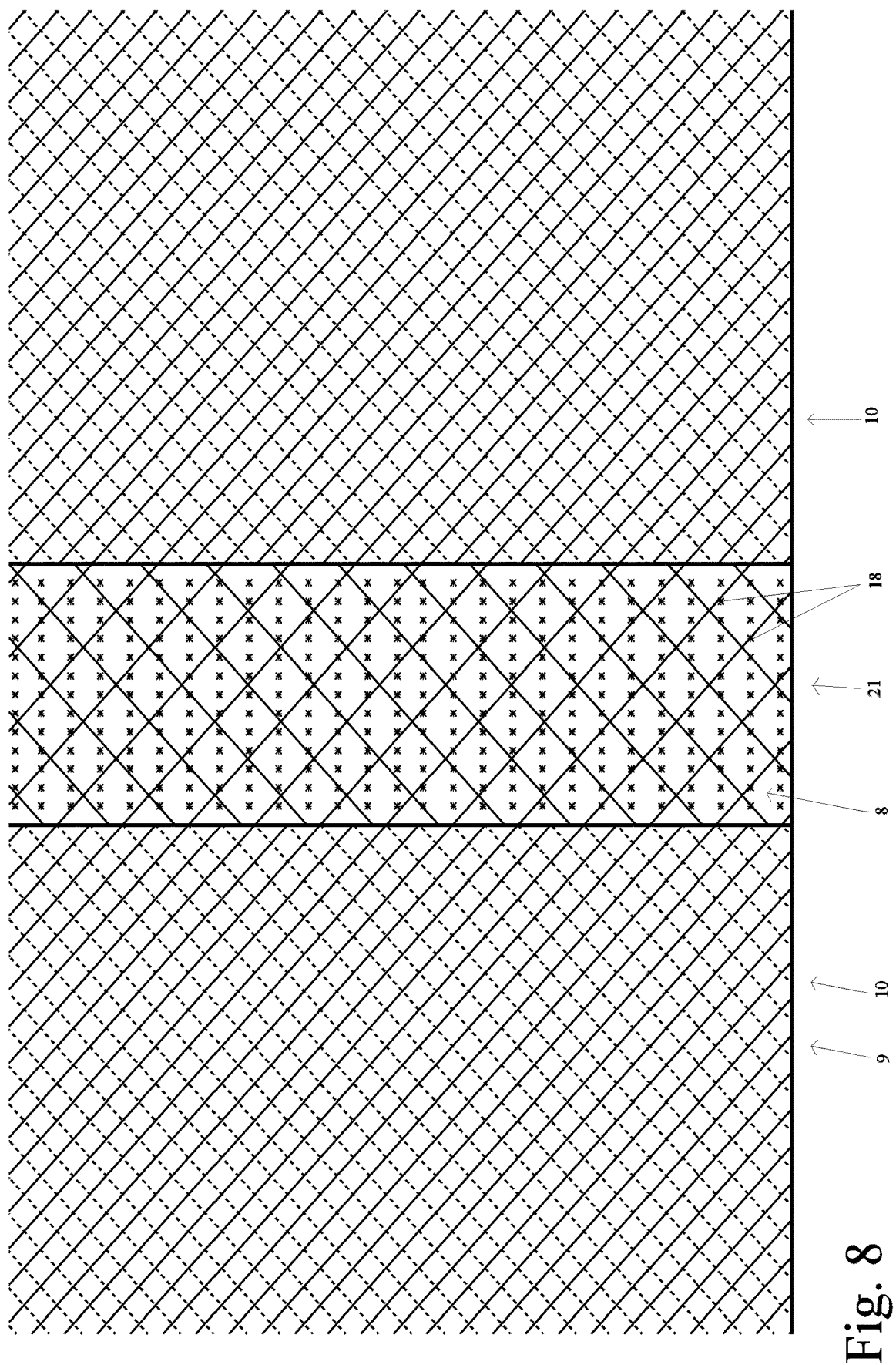
FIG. 8 shows a section of a core element for another control surface element according to the invention wherein in order to form a reinforcement rib, an own form element having seams of fibre composite material is disposed between two core segments.

According to FIG. 8, a foam element 21 separate from the core element 9 is provided to form the reinforcement rib 8, which foam element 21 is provided with seams 18 of fibre bundles. The foam element 21 of the reinforcement rib 8 can consist of a foam different from the foam material of the core element 9 or of the same foam but with a higher density.

A preferred infusion process to produce the previously described control surface elements 1 is shown in FIGS. 9 to 13. This process is described by reference to the control surface element 1 of FIGS. 1, 2 but can also be used to produce the control surface element 1 according to FIG. 3.

Figure 14:
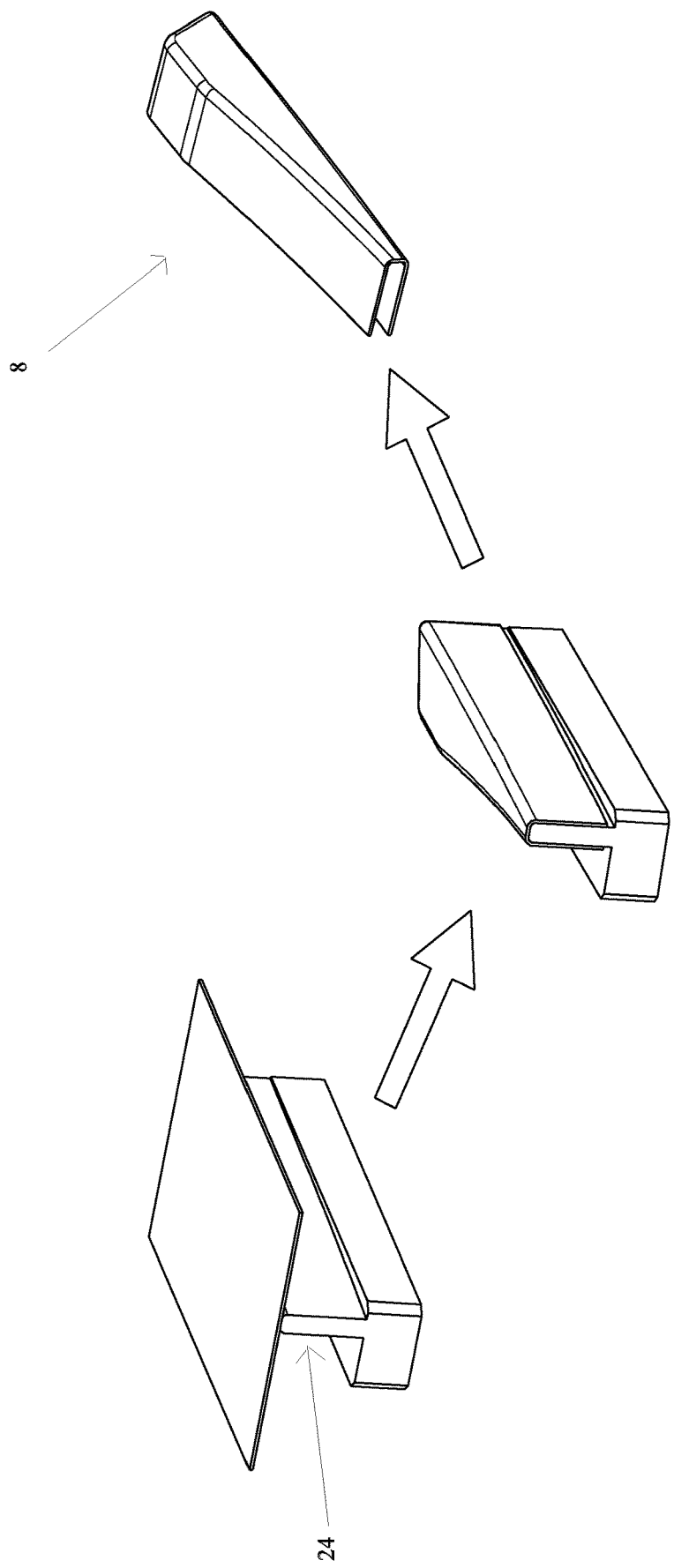
FIG. 14 shows schematically the production of a C-shaped reinforcement rib for the control surface element according to FIG. 1.

In this process a fibre semi-finished product 22 is disposed on the core element 9 in the dry state. The fractions of the fibre semi-finished product 22 for the upper outer skin element 2 are placed on a carrier mould 23 (shown only schematically). The core segments 10 are positioned between the fractions of the fibre semi-finished product 22 for the lower outer skin element 3 and the fractions of the fibre semi-finished product 22 for the reinforcement ribs 8. As a result, the fractions of the fibre semi-finished product 22 for the reinforcement ribs 8 are reliably held by the core segments 10 of the core element 9 during the infusion process. The reinforcement ribs 8 having a C-shaped cross-section can be pre-moulded by means of a moulding tool 24 (cf. FIG. 14). However, it is also possible to shape the fractions of the fibre semi-finished product 22 for the reinforcement ribs 8 only on the carrier mould 23.

Figure 9:
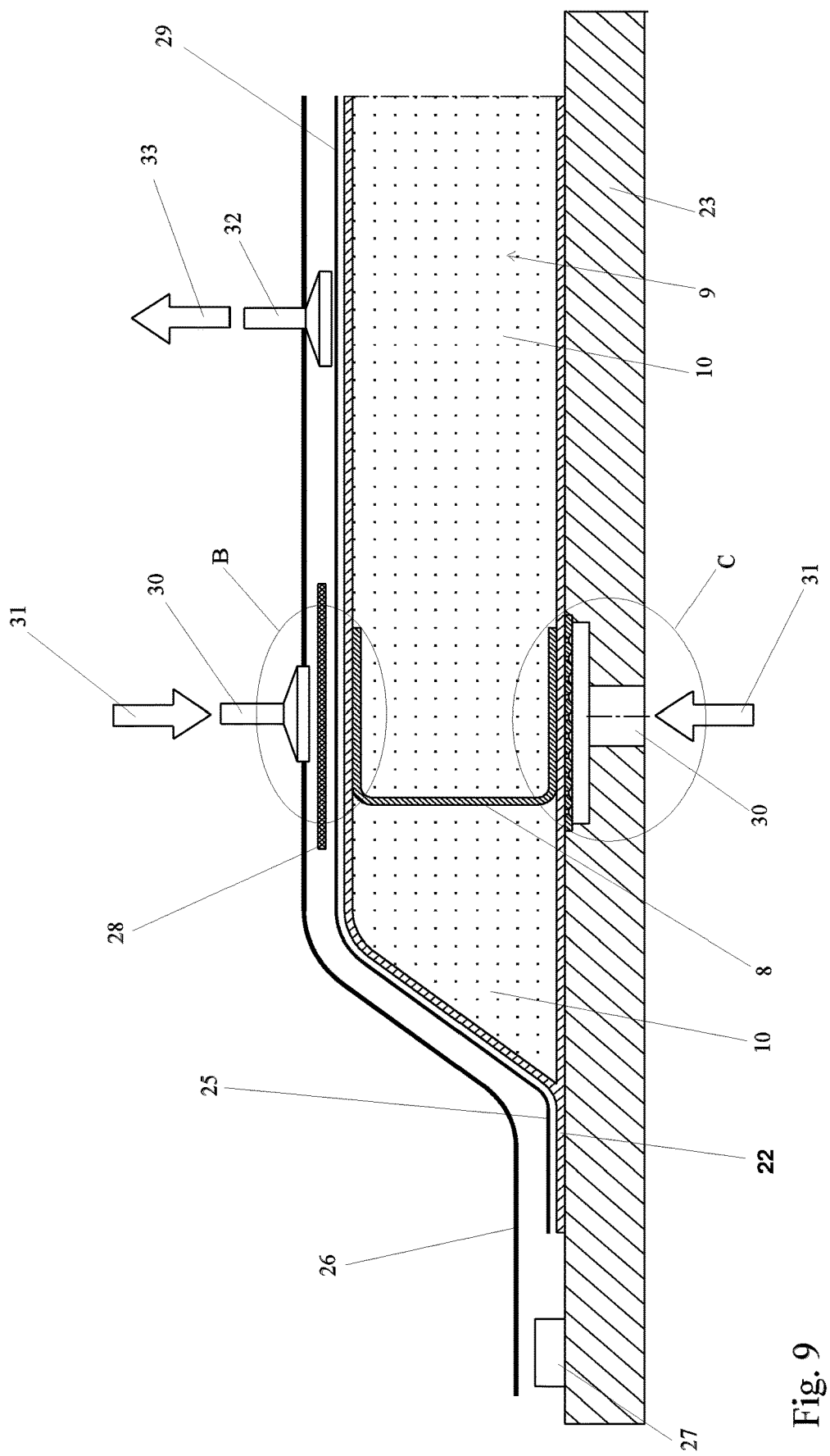
FIG. 9 shows a section along the line IX-IX in FIG. 12 to illustrate the infusion process to produce the control surface element according to FIG. 1.

As can be further seen from FIG. 9, the fibre semi-finished product 22 of the control surface element 1 is encased by a film structure or woven fabric structure on the carrier mould 3. On the outer side an airtight film 26 is provided (also designated as vacuum bag) which is applied to the carrier mould 23 via a sealing device 27. An infusion space 25 for impregnation of the fibre semi-finished product 22 is created between the airtight film 26 and the carrier mould 23. Furthermore, a flow aid or distributor membrane 28 is provided by means which the sucked-in plastic can be distributed over the component surface. Furthermore a peel ply 29 is provided which is attached directly to the lower side of the control surface element 1. The peel ply 29 facilitates the removal of the distributor membrane 28 impregnated with the plastic material or matrix material.

Figure 10:
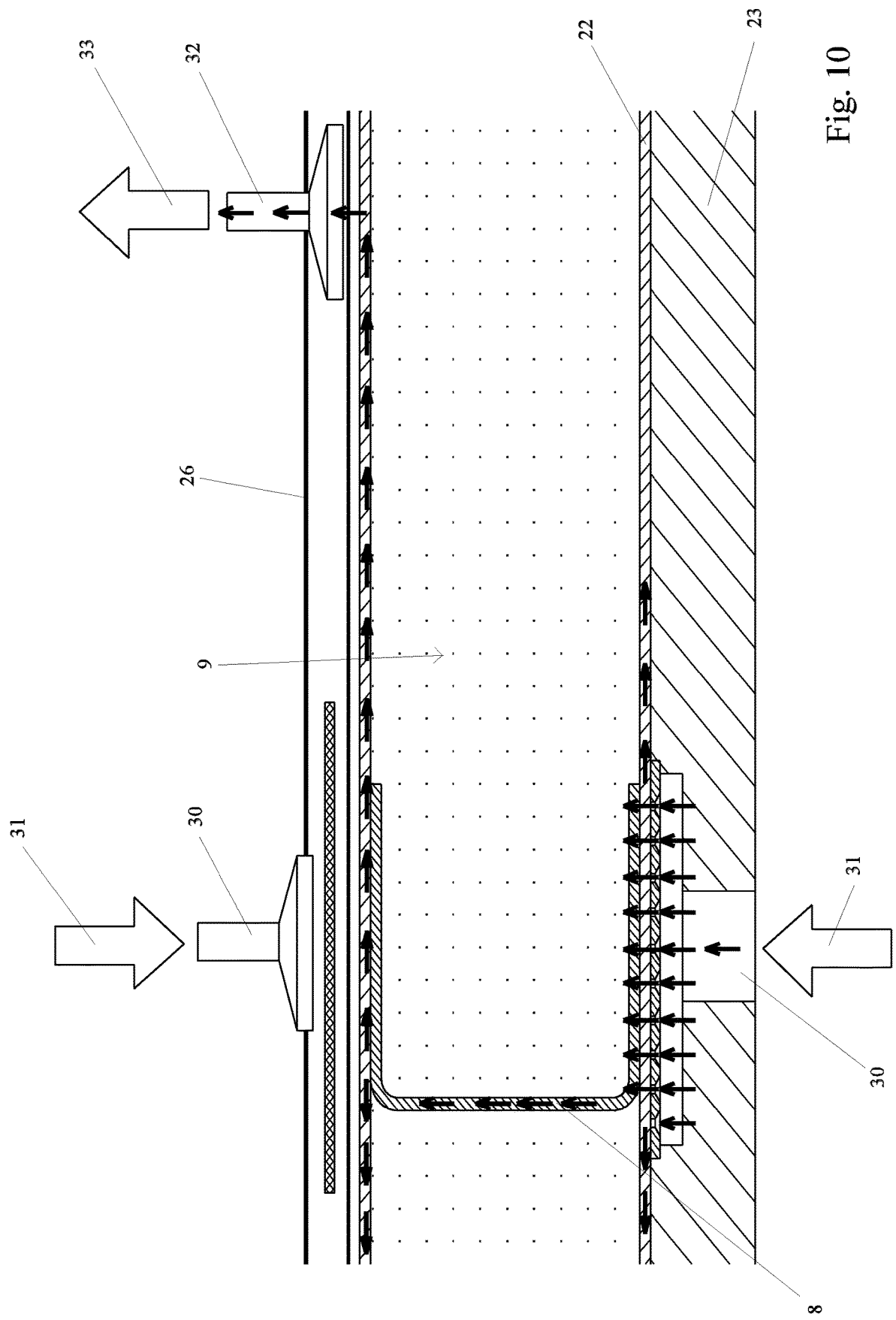
FIG. 10 shows a view of the detail B indicated by a circle in FIG. 9.
Figure 11:
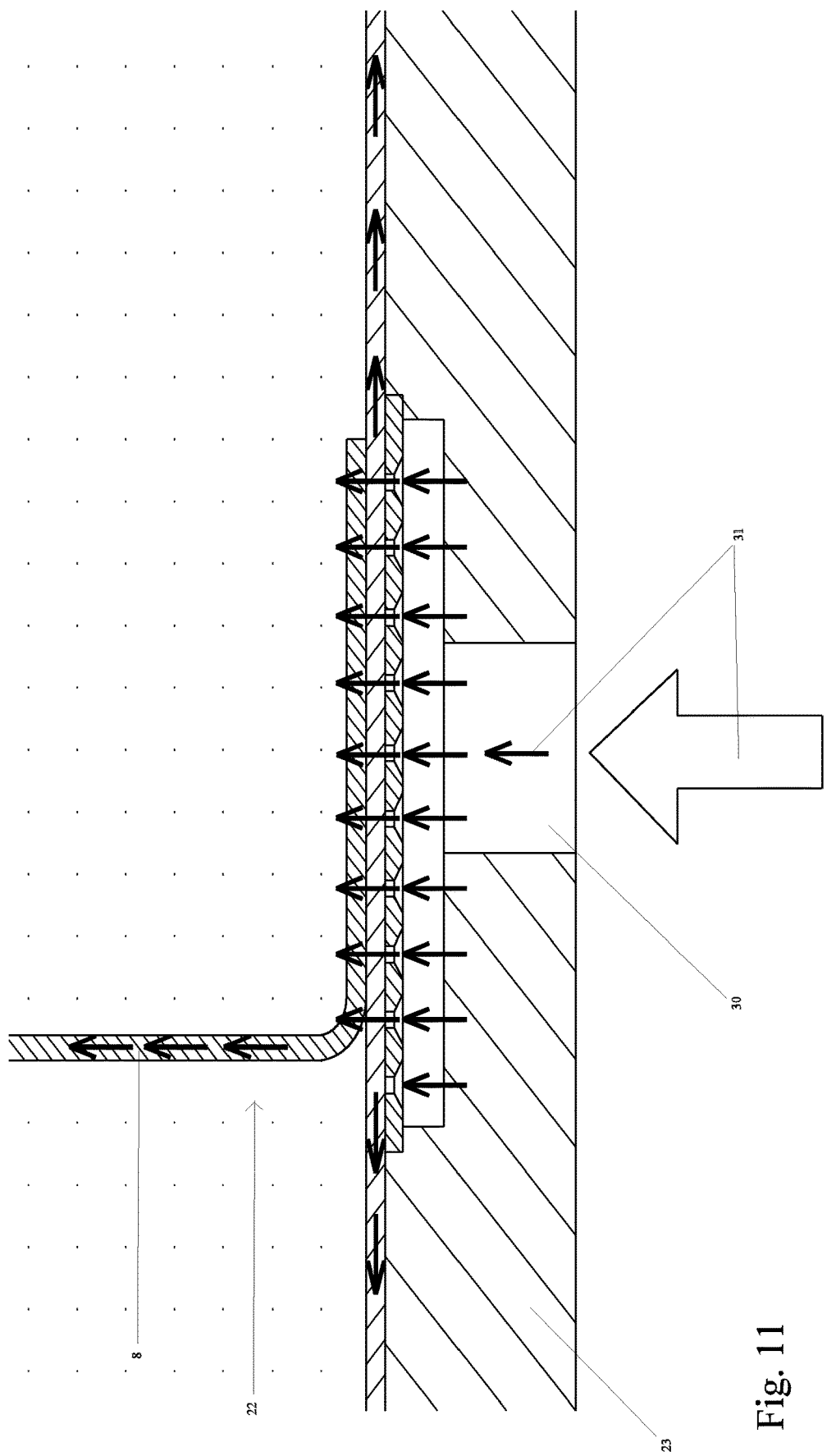
FIG. 11 shows a view of the detail C indicated by a circle in FIG. 9.
Figure 12:
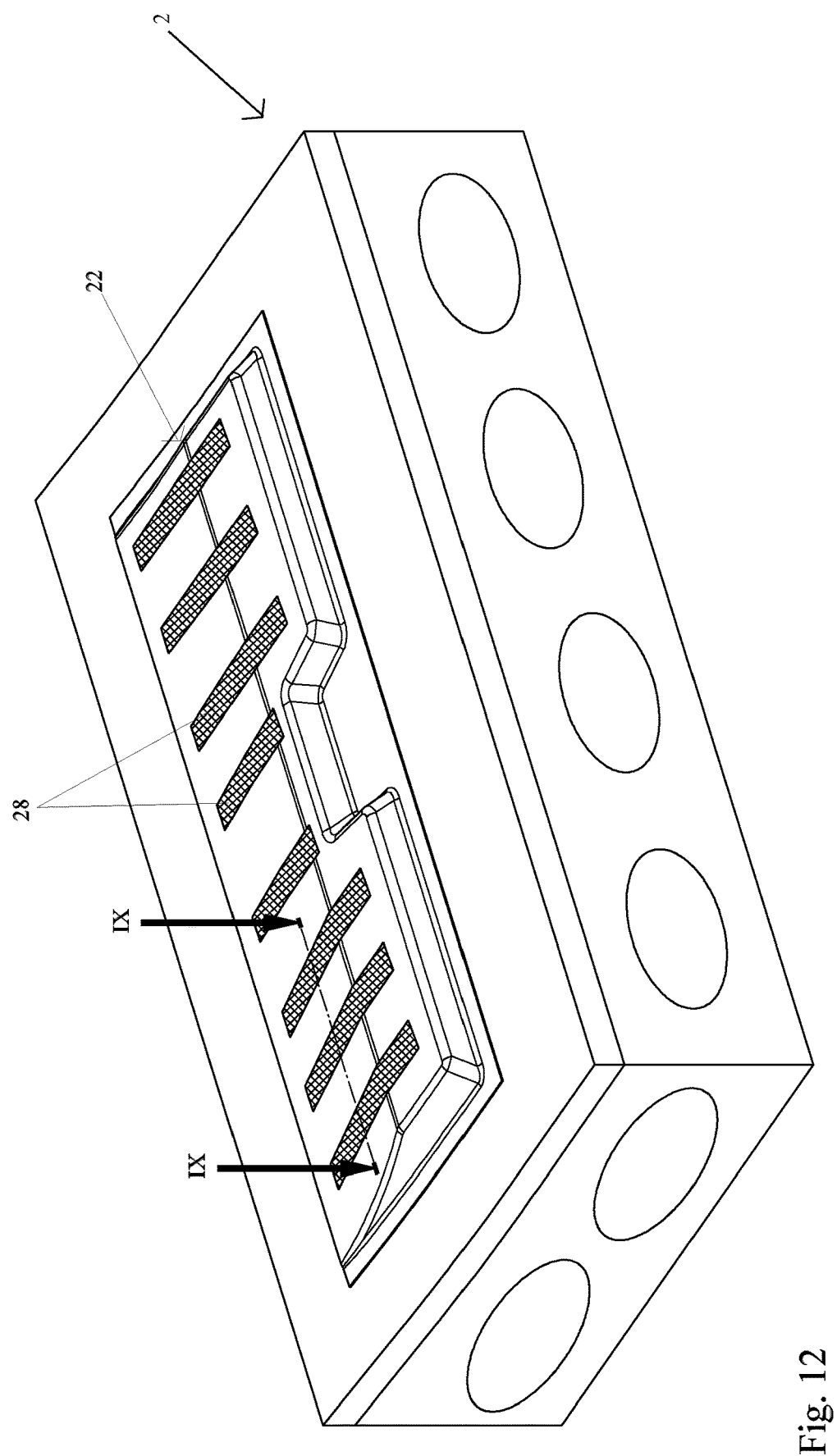
FIG. 12 shows schematically a device for producing the control surface element according to FIG. 1.
Figure 13:
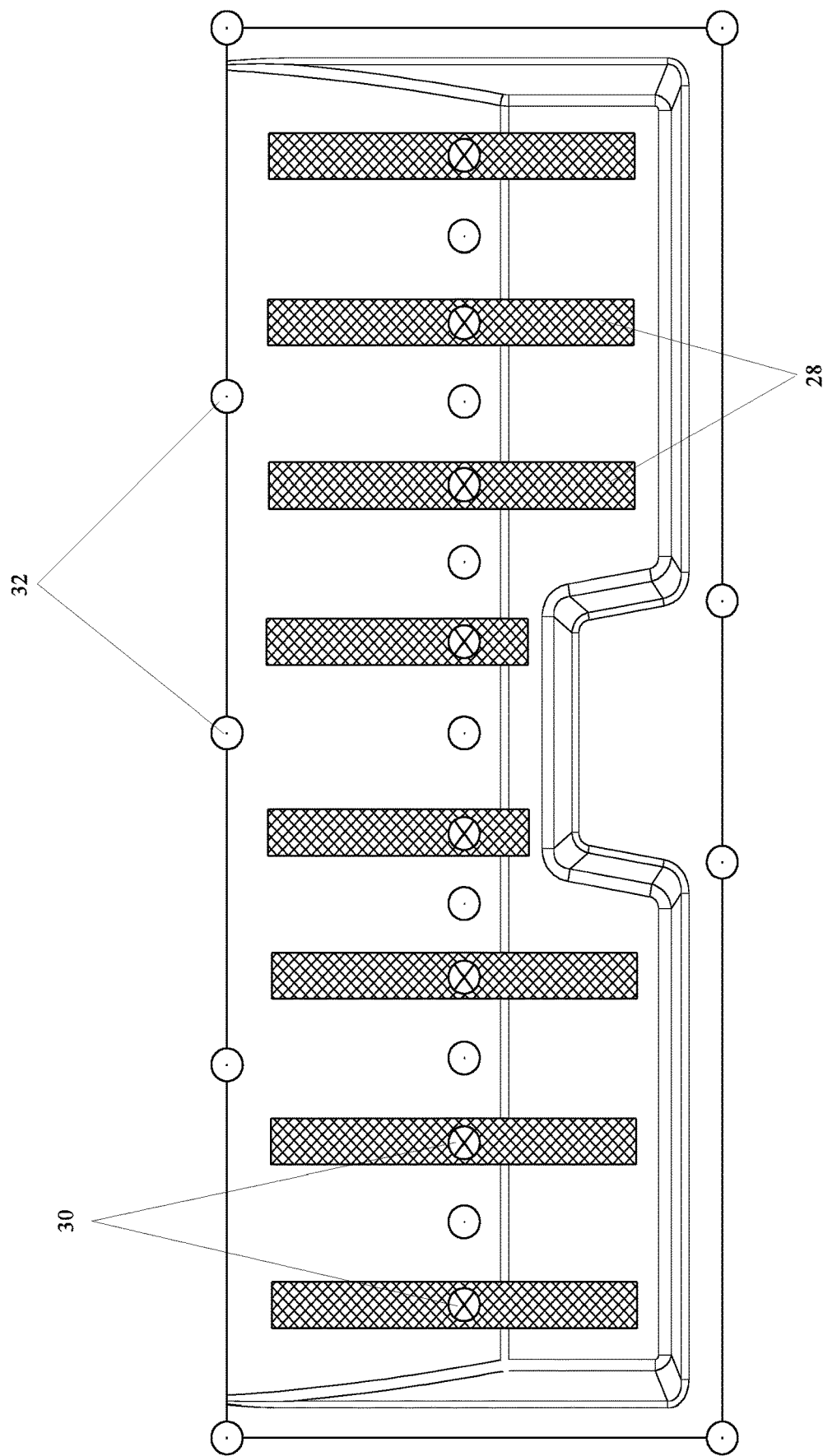
FIG. 13 shows schematically a plan view of the device according to FIG. 12.

As can be seen from FIGS. 9 to 11, supply lines 30 for the plastic in the liquid state (cf. arrows 31) are provided. In the embodiment shown the supply lines 30 are provided both on the side of the carrier mould 23 and on the side of the airtight film 26. In addition, vacuum lines 32 at which a negative pressure is applied in each case are provided on the side facing away from the carrier mould 23. By application of the negative pressure to the vacuum lines 32, the plastic in the liquid state is sucked through the supply lines 30 into the infusion space 25 wherein the fibre semi-finished product 22 is impregnated with the plastic to form the upper outer skin element 2, the lower outer skin element 3 and the reinforcement ribs 8. After complete impregnation of the fibre semi-finished product 22, the plastic passes into the vacuum lines 32 (cf. arrows 33). In each vacuum line 32 a membrane filter (not shown) which is permeable to air and impermeable to resin in the dry state is provided, which goes over into a substantially airtight state during an impregnation with the plastic. When completely wetted with the plastic, the membrane filter closes, whereby the air intake is interrupted. The control surface element 1 is then cured in an oven (not shown).

The invention claimed is:

1. A control surface element for an aircraft comprising:
   an upper outer skin element which has an outer face around which air flows,
   a lower outer skin element,
   a reinforcement rib,
   a core element made of a foam material, and
   a bearing device,
   wherein the reinforcement rib is disposed between a first and a second core segment of the core element,
   wherein the reinforcement rib has a web extending perpendicular to a longitudinal direction of the upper outer skin element,
   wherein the first core segment is in contact with a first longitudinal side of the web and the second core segment is in contact with a second longitudinal side of the web,
   wherein the web of the reinforcement rib extends from an inner side of the upper outer skin element to an inner side of the lower outer skin element,
   wherein the reinforcement rib has an upper flange extending parallel to a principal plane of the upper outer skin element, the upper flange being arranged on the inner side of the upper outer skin element, the reinforcement rib further having a lower flange extending parallel to a principal plane of the lower outer skin element, the lower flange being arranged on the inner side of the lower outer skin element, the upper flange and the lower flange being disposed at an angle to the web, respectively, wherein the reinforcement rib is formed by a fiber composite element extending continuously between the inner side of the upper outer skin element and the inner side of the lower outer skin element,
   wherein the lower outer skin element has a recess on an exterior side for the bearing device; and
   wherein the bearing device comprises a bearing element for articulated mounting on a structure component of an aircraft wing.

2. The control surface element according to claim 1, wherein the core element completely fills intermediate spaces formed between the upper outer skin element, the lower outer skin element, and the reinforcement rib.

3. The control surface element according to claim 1, wherein the first or second core segment has a lower recess for the lower flange of the reinforcement rib on a lower side facing the inner side of the lower outer skin element and/or an upper recess for the upper flange of the reinforcement rib on an upper side facing the inner side of the upper outer skin element.

4. The control surface element according to claim 1, wherein the upper outer skin element, the lower outer skin element, and the reinforcement rib consist of fiber composite material, wherein the upper outer skin element, the reinforcement rib, and the lower outer skin element are interconnected via the fiber composite material.

5. The control surface element according to claim 1, wherein the foam material of the core element is formed from polymethacrylimide.

6. A control surface element for an aircraft comprising:
an upper outer skin element which has an outer face around which air flows,
a lower outer skin element,
a reinforcement rib, and
a core element made of a foam material,
wherein the reinforcement rib is disposed between a first and a second core segment of the core element,
wherein the reinforcement rib comprises a foam element separate from the core element which is provided with seams made of fiber composite material,
wherein the foam element of the reinforcement rib consists of a foam material which is different from the foam material of the core element, or of the same foam material but with a higher density.

* * * * *